Patented Dec. 18, 1934

1,984,713

UNITED STATES PATENT OFFICE 1,984,713

ABIETYL ESTERS OF SULPHOPROPANE-DIOL AND PROCESS OF PREPARING THE SAME

Henry J. Weiland and Clyde O. Henke, South Milwaukee, Wis., and Gastao Etzel, Pennsgrove, N. J., assignors to E. I. du Pont de Nemours & Company, Wilmington, Del., a corporation of Delaware No Drawing. Application July 8, 1932, Serial No. 621,514

11 Claims. (Cl. 260—99.40)

This invention relates to novel compositions of matter. It is an object of this invention to produce novel compositions of matter which are characterized by extremely high wetting powers and are therefore useful as wetting and penetrating agents. It is a further object of this invention to provide a convenient and economical process for producing such novel compositions.

Other and further important objects of this invention will appear as the description proceeds.

Our novel compositions of matter are characterized by containing as the active constituent a compound which may be considered as the monoabietic - acid ester of 1, 2 - propane - diol - 3 - sulphonic acid or its water-soluble salts. Our novel compounds, which form an integral part of this invention, possess a chemical structure corresponding to the formula:

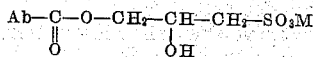

wherein Ab stands for the hydrocarbon radical of the abietic acid structure, that is, for the radical $C_{19}H_{29}$ in the case of abietic acid and for the radical $C_{19}H_{31}$ or $C_{19}H_{33}$ in the case of hydrogenated abietic acid, while M stands for hydrogen or a metallic atom or radical such as Na, K, or $NH_4$.

These novel compounds may be synthesized by reacting an abietic acid containing material, such as wood or gum rosin, abietic acid, or hydrogenated abietic acid, or an alkali metal or ammonium salt of these, with 1-halogen-2-propanol-3-sulphonic acid or a salt thereof in an alkaline medium. This reaction may be illustrated by the following equation:

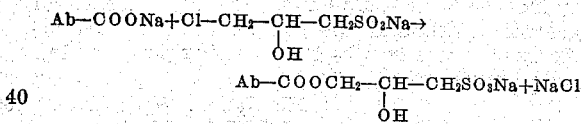

The reaction product is characterized by extremely high wetting and penetrating powers, which is particularly noticeable at high dilutions. Thus, when used in a concentration of 1 part in 1000, its wetting power, when measured inversely by the sinking time required for a standard piece of yarn according to Draves' and Clarkson's method (Am. Dyestuff Reptr., 20, 201–7) is 4 to 7 times as great as that of isopropyl-naphthalene-sodium-sulphonate. It also has valuable emulsifying properties.

Since high-power wetting agents, capable of acting at extreme dilution, are in great demand in many technical fields, our novel compounds constitute an extremely valuable contribution to the arts where wet treatment of materials is employed. Such arts include the washing, cleansing, dyeing or bleaching of textile fibers, both of vegetable and animal origin; the liquid treatment of hides, leather, furs, including such operations as tanning, cleansing or dyeing; washing or spraying of fruits, seeds, or nuts; and so forth.

Without limiting our invention to any particular procedure, the following example is given for the purpose of illustrating the same. Parts given are parts by weight.

Example 302 parts of gum rosin (grade N), 800 parts of alcohol, 40 parts of caustic soda and 200 parts of water are charged into an autoclave. 196 parts of chloro - propanol - sodium - sulphonate (1,2,3) are added. The vessel is closed and heated with stirring at 140° C. for about 15 hours. The pressure during this period is about 100 pounds per square inch. At the end of this period, the reaction is complete, and the product may be isolated in the following manner.

After allowing to cool to about 50–75° C., the mass is allowed to settle, whereby the salt of formation (NaCl) settles out. The clear liquor is then separated by decantation or filtration, partially evaporated at ordinary pressure, and then further evaporated to dryness (at 115 to 125° C.) under an absolute pressure of about 40 mm. of mercury.

The product thus obtained, in very good yield, consists essentially of the normal abietic acid ester of propane-diol-3-sodium-sulphonate. It constitutes a grayish or tannish white solid soluble in alcohol and in benzol. It dissolves also in warm water and forms a clear solution at 2 to 10% concentration. On diluting, however, to 0.25% or lower, the solution may become murky and acquire the appearance of a soap solution. If 0.10% aqueous solution of this compound is tested for wetting power by the Draves and Clarkson method (ibid.), using a 5 gram skein, it gives a sinking test of about 30 seconds. A sample of isopropyl-naphthalene-sodium-sulphonate under similar conditions required over 200 seconds.

If desired, the isolation of the reaction product as prepared above may be simplified as follows. At the end of the 15 hour heating period, while the mass is still at 140° C., a valve in the autoclave is opened to relieve the pressure and distill out the alcohol. The residue is then further dried under a vacuum as above. The solid product is then removed from the autoclave and pulverized. The product in this case, clearly, contains all the salt of formation (NaCl); but it has otherwise all the essential properties of the pure product, including the high wetting power, except of course for the slight diminution due to the lesser quantity of the pure ester per unit weight.

As will be understood, from the last mentioned circumstance, it is not essential to isolate our novel compound in pure form in order to avail oneself of its high wetting properties. On the contrary, for use as a wetting agent, it may be mixed with various other assistants or reagents, which may be desirable for the particular treatment of materials in which it is intended to be used. And these preparations may be manufactured and handled in solid form as a cake or powder, or as a solution in water, alcohol, or other suitable solvent.

For the same reason, it will be apparent that we need not start with pure abietic acid for the purpose of manufacturing our novel compound. Rosin of any grade, either gum or wood, may be used. Hydrogenated rosin or hydrogenated abietic acid gives a particularly high grade and colorless product. Either rosin or abietic acid as such may be used, or a salt or soap thereof, such as the sodium or potassium salt. In either case the procedure is essentially the same as above, except that the quantities of initial material may be varied somewhat to correspond to the material used. Thus if hydrogenated rosin is used, it will suffice, in view of its higher acid number, to start with 290-295 parts of it in lieu of the 302 parts of gum rosin indicated in the example. So also, where a rosin soap is used, the quantity of alkali added to the reaction mass may be considerably cut down, as will be readily understood to those skilled in the art. As alkaline medium for the reaction, caustic soda, caustic potash, or other strong alkalis may be used.

The temperature of the reaction may be varied within wide limits. An experiment run at 165° C. did not show any practical difference in the result. Pressure is not essential for the reaction except, of course, insofar as it keeps the solvent from evaporating.

Many other variations and modifications are possible in the procedure set forth without departing from the spirit of this invention.

We claim:

1. An ester of 3-sulpho-propane-diol possessing the following general formula:

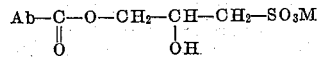

wherein Ab stands for the radical $C_{19}H_{29}$ of abietic acid or $C_{19}H_{31}$ or $C_{19}H_{33}$ of hydrogenated abietic acid, while M stands for hydrogen or a metal atom or radical.

2. An abietic acid ester of 3-sulpho-2,1-propane-diol.

3. The process of producing an ester which comprises reacting a compound selected from the group consisting of rosin, hydrogenated rosin, abietic acid, or alkali metal salts of these, with a compound of the group consisting of 1-halogen-2-propanol-3-sulphonic acid and its alkali-metal salts.

4. The process of producing an ester which comprises reacting a sodium-abietate with 1-chloro-2-propanol-3-sulphonic acid.

5. The process of producing an ester which comprises heating under pressure substantially 302 parts of abietic acid, 40 parts of caustic soda and 196 parts of 3-chloro-2-propanol-1-sodium-sulphonate in an aqueous alcoholic medium, and recovering the reaction product.

6. The process of producing an ester which comprises heating under pressure substantially 290 parts of hydrogenated abietic acid, 40 parts of caustic soda and 196 parts of 3-chloro-2-propanol-1-sodium-sulphonate in an aqueous alcoholic medium, and recovering the reaction product.

7. An ester of the following general formula:

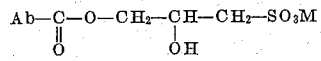

wherein Ab stands for the residue of abietic acid or hydrogenated abietic acid, while M stands for hydrogen, an alkali metal, or ammonium.

8. An abietyl ester of sulpho-propane-diol which in the form of its free acid possesses the following formula:

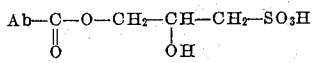

wherein Ab stands for the hydrocarbon radical of abietic acid or hydrogenated abietic acid, said ester being characterized by high wetting power in dilute aqueous solutions.

9. An ester of the following general formula:

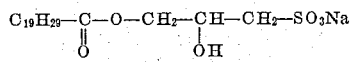

wherein $C_{19}H_{29}$ stands for the residue of abietic acid.

10. An ester of the following general formula:

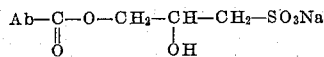

wherein Ab stands for the radical $C_{19}H_{31}$ or $C_{19}H_{33}$ of hydrogenated abietic acid.

11. An ester compound of the abietic acid series, said compound being substantially identical with the product obtainable by reacting abietic acid or its hydrogenated form with 1-chloro-2-propanol-3-sodium-sulphonate in the presence of caustic alkali, and said compound being particularly characterized by high wetting power at low concentrations.

HENRY J. WEILAND.
CLYDE O. HENKE.
GASTAO ETZEL.